United States Patent Office 2,855,428
Patented Oct. 7, 1958

2,855,428

PREPARATION OF AMINO NITRILES

John J. Singer, Westboro, Mass., and Mark Weisberg, Providence, R. I., assignors, by mesne assignments, to Hampshire Chemical Corporation, Providence, R. I., a corporation of Delaware No Drawing. Application October 25, 1956
Serial No. 618,194

14 Claims. (Cl. 260—465.5)

This invention relates to the preparation of amine nitriles and, in particular it relates to a process which is adaptable to continuous operation for the preparation of amine nitriles, which are of particular value in the formation of chelating or complexing agents by hydrolysis or saponification.

Three well known methods exist for the manufacture of amino acid type chelating agents, the techniques being fully annotated in the general chemical literature and the patent literature. The oldest method is based upon the coupling of an amine with chloracetic acid, well exemplified by the synthesis of ethylenediaminetetraacetic acid from ethylenediamine and chloracetic acid as shown in United States Patent 2,130,505, Munz, dated, September 20, 1938.

A second useful method of synthesizing amino acid type chelating agents is based upon the oxidation of appropriately substituted amines as described in U. S. Patent 2,384,818, Curme et al., dated September 18, 1945. In general a starting amine is selected which carries an ethanol radical attached to a nitrogen atom.

Neither of these methods involves formation of the nitrile or its hydrolysis.

A third very commonly used method for the synthesis of amino acid complexing agents is that described in United States Patent 2,407,645, Bersworth, September 17, 1946. An alternative method involves formation and separation of the nitrile, with subsequent hydrolysis, as described in United States Patents 2,164,781, Ploetz, July 4, 1939, and 2,205,995, Ulrich, June 25, 1940. In the Bersworth synthesis the conditions of operation call for an alkaline aqueous medium which induces hydrolysis of the nitrile as it is formed. In this reaction, therefore, the nitrile is never actually isolated, but the mechanism of the reaction calls for considering it directly converted, as formed, in solution, to the alkali metal salt of the carboxylic acid because of the high pH of the medium.

United States Patents 2,164,781 and 2,205,995 involve the synthesis and isolation of nitrile from the reaction mixture. The nitrile is subsequently hydrolyzed in strong caustic solution to form the sodium salt of the acetic acid derivative of the amine reacted. In this latter method the reaction in which the nitrile is formed is conducted in a strongly acid medium.

For example, in one instance sodium bisulfite, formaldehyde, sodium cyanide, sulfuric acid and the amine are mixed together in proportions which assure an acid pH. The reactants are heated and allowed to age for many hours and the nitrile gradually crystallizes from the solution, to be removed by filtration. Presumably, the mechanism of this reaction involves the formation of a formaldehyde-sulfite addition product as an intermediate.

U. S. Patent 2,205,995, involves the reaction of the acid sulfate salt of ethylenediamine in a solution containing formaldehyde and sodium cyanide plus additional sulfuric acid so that the sodium cyanide is converted to hydrocyanic acid. As in the preceding patent, the reactants are mixed together as a batch, the temperature is raised and the reaction mixture allowed to age for many hours. The nitrile of the amine is removed from the reaction mixture by filtration.

Such methods are useful in the synthesis of only those nitriles which can be easily separated from the reaction mixture. The method is unsatisfactory for preparing nitriles which exhibit high solubility in the reaction mixture or which, because of lack of stability, hydrolyze during the long aging period at elevated temperatures. Because of the extremely high concentration of sulfuric acid, glass equipment must invariably be used.

It is, accordingly, a fundamental object of this invention to provide a method of synthesizing amine nitriles which makes them directly and substantially quantitatively recoverable.

It is another object of the invention to provide a method of synthesizing nitriles which can be carried out on substantially a continuous or semi-continuous basis.

It is another object of the invention to provide a method of synthesizing nitriles which involves the use of relatively small quantities of strong acid, which utilizes liquid hydrocyanic acid, and which can use regular stainless steel equipment.

Other objects and advantages of the invention will in part be obvious and in part appear hereinafter.

The invention, accordingly, is embodied in a method of synthesizing amino nitriles on a continuous, semi-continuous, or batch basis involving the use of small quantities of sulfuric acid which serve merely to maintain the acidity of the reaction medium. The acid prevents polymerization of hydrocyanic acid; pH is kept at a level below about 3, and preferably below about 1. The method is carried out in a substantially continuous operation by maintaining a reaction medium or zone with formaldehyde therein, to which medium an acidifying quantity of concentrated sulfuric acid is added. To this medium liquid hydrocyanic acid is also added. The temperature of the mixture is kept at a level to maintain the reaction medium in the liquid phase, a pressurized vessel being used if necessary, whereupon the appropriate amine is fed into the reaction medium or zone at a rate such that excessive boiling of liquid hydrocyanic acid is avoided. When the process is carried out in substantially this manner using ammonia, or an amine having 1 or 2 replaceable hydrogens, an exothermic reaction results and the nitrile of the amine added to the solution is formed and immediately precipitated.

For continuous operation a portion of the reaction medium containing precipitated nitrile is pumped from the reaction zone to a separatory zone, such as a filter or centrifuge, to remove the nitrile from the reaction mixture which reaction mixture is then fed back to the reaction zone. During the filtering operation additional amounts of hydrocyanic acid and formaldehyde are added to the reaction zone to replace the materials consumed in the reaction with the amine to form the nitrile, which is removed from the system.

The reaction carried out as outlined gives essentially quantitative yields of the nitrile of the amine. Generally, estimates of yeld are based on the quantity of the amine used, the most costly reactant. Ammonia, alkyl amines, aryl amines, aralkyl amines, alkylene and similarly substituted alkylene diamines of all degrees of substitution may be used, the reactive portion of the amine being the 1, 2 or 3 positions on the nitrogen occupied by hydrogen. The compositions which are formed become fully substituted with nitrile groups in the reaction.

In general, relatively low reaction temperatures of the order of 35 to 50° C. are preferred and are completely satisfactory, because reaction proceeds quite rapidly. We have found that after the process has been under way continuously for many hours the reaction solution in the reaction zone itself remains essentially clear and water white in color. It may be of importance to maintain close inspection of the color of the reaction solution in order to make possible the production of pure white nitriles. If it develops a slight coloration, it then becomes desirable to remove the color with activated charcoal.

Though we have indicated a preferred temperature range of 35 to 50° C. the temperature can be allowed to approach levels of 90 to 100° C.

The invention, accordingly is embodied in the process comprising the steps and combinations of steps involved in forming amine nitriles using any amine compound carrying at least one replaceable amino hydrogen by establishing a reaction medium containing formaldehyde, or an aldehyde yielding material, and hydrocyanic acid, maintaining the temperature at a level below about 100° C., adding the amine thereto and separating the precipitated nitrile.

The scope of the invention and its application to specific situations may be understood by reference to the following examples illustrating typical useful syntheses.

*Example I*

Place four gram moles of formaldehyde, 37 to 50 percent aqueous solution, in a reaction vessel. To the formaldehyde solution add approximately 2 milliliters of 96 percent sulfuric acid, then add to the formaldehyde-acid solution 4 moles of liquid hydrocyanic acid. Raise the temperature of this mixture slowly to about 35° C. and feed ethylenediamine to the system at a rate such that excessive boiling of the liquid hydrocyanic acid is avoided. Substantially immediately when ethylenediamine is added to this reaction medium in the temperature range of 35° to 50° C., an exothermic reaction occurs and a precipitate of ethylenediaminetetraaceto nitrile is formed.

For completion of the reaction, add ethylenediamine steadily while maintaining the temperature in the preferred range, near 35° C., until one mole of ethylenediamine has been added. The rate of addition of the amine is controlled by the temperature it is desired to maintain and, hence, by the efficiency with which the reaction mixture can be cooled. Rate of addition is also controlled by pH. For best results the alkaline amine or ammonia should not be added so fast that the pH rises above 1.0. In this fashion complete utilization of the hydrocyanic acid occurs with substantially quantitative yield of ethylenediaminetetraaceto nitrile.

It is possible to use a pressurized vessel and higher temperatures approaching 90 to 100° C., but it is preferable to avoid such temperature levels, because they result in somewhat reduced yields and the development of color in the reaction mixture. The process is, of course, best performed under pressure in a closed system to prevent excessive loss of the toxic volatile hydrocyanic acid. A cold finger type of reflux condenser is useful in minimizing pressurization of the equipment.

With completion of the addition of the ethylenediamine, filter the solution to remove the tetraaceto nitrile. It is then hydrolyzed with four moles of aqueous caustic alkali to form the tetra sodium salt of ethylenediaminetetraacetic acid. It may be kept as the nitrile.

*Example II*

The same reaction conditions are established and the process is carried out continuously by bleeding off the reaction mixture containing the precipitated nitrile, filtering it, and returning the reaction medium to the reaction zone. In the process described in Example I the rate of addition of ethylenediamine was one mole in about 20 minutes.

Accordingly, in the continuous process involving recirculation of reaction medium amounts of formaldehyde and hydrocyanic acid corresponding to those consumed were added to the reaction zone. Continuous operations were carried on for a period of 8 hours with the formation of 23.8 moles of ethylenediaminetetraaceto nitrile based on 24 moles of ethylenediamine starting material, a recovery of more than 99 percent of starting ethylenediamine.

In carrying out the reaction continuously we have found that the mixture described will give essentially quantitative yields of the tetranitrile based on the ethylenediamine. At temperatures ranging from 30° to 35° C. the reaction proceeds very rapidly. The reaction mixture itself remains clear and water white in color.

It will be found in conducting the reaction on a continuous basis that the addition of 37 to 50 percent aqueous solutions of formaldehyde to replace formaldehyde consumed results in an increase in the volume of the reaction mixture in the reaction zone, because the water of the formaldehyde solution accumulates. Generally this increase in volume will not be objectionable because even in a continuous operation a certain amount of excess can be periodically removed for reaction in a batch operation by the addition of essentially equimolar quantities of ethylenediamine to the mixture. Where the process is carried out under essentially the conditions described, namely, low pH, temperature 35°–50° C. and corresponding rate of addition, consistently the yields will be 90 to 99 percent, based on the ethylenediamine.

To avoid objectionable increase in the volume of the reaction mixture operation in accordance with the following example is recommended:

*Example III*

Paraformaldehyde will react with amines to form the nitrile under the conditions of the process described in Example I. It forms a good substitute for aqueous solutions of formaldehyde. In fact any relatively low molecular weight paraformaldehyde used will have sufficient solubility in hot water to permit separation of the nitrile as the solid phase from the reaction mixture essentially without contamination by the paraformaldehyde, which dissolves in the hot water.

Paraformaldehyde powder was dissolved in hot water at a temperature of 40° C. to form a saturated solution. To this solution there was added two milliliters of 96 percent sulfuric acid per 300 cc. of solution and equivalent amounts of liquid hydrocyanic acid based on the formaldehyde. The temperature of the solution was kept at approximately 40° C. and ethylenediamine was added to the medium. The rate of addition of ethylenediamine was matched to the rate of cooling of the reaction of the mixture so that the temperature remained in the range of about 40° C. and keeping the pH below 1.0 at all times. Ethylenediaminetetraaceto nitrile was precipitated as fast as the ethylenediamine was added. It was possible to keep the reaction going on a continuous basis with periodic additions of solid paraformaldehyde and liquid hydrocyanic acid without materially altering the volume of the reaction mixture. Operating thus, that is, with a constant volume of water to which paraformaldehyde and liquid hydrocyanic acid were added at a rate to replace the amounts consumed by reaction with the ethylenediamine, it was possible to keep the reaction going on a continuous basis for several hours. Periodically, at intervals, a portion of the reaction medium was withdrawn to separate solid ethylenediaminetetraaceto nitrile. Material balance measurements indicated the reaction to be virtually quantitative, whether on the basis of ethylenediamine, formaldehyde, or hydrocyanic acid.

One mole of water is released from each mole of formaldehyde or paraformaldehyde, $CH_2O$ or $(CH_2O)_x$, when the nitrile is formed. A slight increase of volume is to be expected even when the paraformaldehyde is used.

This is offset by a loss of reaction mixture as drag-out by the nitrilo crystals.

The reaction process as described is useful for continuous operation in a recirculating pipe set up carried out as follows:

*Example IV*

For continuous operation the manipulation corresponds exactly to that involved in Examples I, II, and III and it will be found that the paraformaldehyde operation of Example III is preferable in that it involves no addition of water. Hence, volume control in the reaction zone is simplified.

Formaldehyde and liquid hydrocyanic acid are added to the reaction zone in stoichiometric amounts as required by the nitrile to be made. It has been indicated that the broad temperature range for the reaction zone will be preferably in the range from about 35° C. to about 100° C. Also that the pH is preferably less than 1. Once the reaction zone has been set up for the appropriate nitrile, addition of the amine produces, in general, the precipitate of the desired nitrile which is bled out of the reaction zone in suspension in some of the reaction medium. It is separated by filtration or centrifuge and the reaction liquor returned to the reaction zone, the product being taken to further purification stages.

In the continuous preparation of ethylenediaminetetraaceto nitrile an appropriate volume of water is established in a reaction kettle and to this paraformaldehyde is added. Also liquid hydrogen cyanide is added together with sulfuric acid to bring the pH to a level less than 1. Ethylenediamine is fed to the reaction zone at a rate sufficient to make temperature control at the desired level feasible and generally, 40° C., is a preferred level. As nitrile precipitates and forms in the medium it is bled out and separated from the reaction liquor. Formaldehyde, which is consumed in the reaction, is replaced by periodic small additions of paraformaldehyde. Similarly, liquid hydrogen cyanide is fed into the reaction zone to replace that consumed. Inasmuch as the amount of aldehyde and hydrogen cyanide are each quantitatively consumed in the reaction, direct, steady stoichiometric additions of the three ingredients are made, it being necessary merely to control rates of flow to the reaction zone to maintain complete quantitative conversion. A typical operation on a small scale involves the following rates of feed:

| | |
|---|---|
| Formaldehyde (as paraformaldehyde) | 180 grams or pounds per hour. |
| Hydrocyanic acid (liquid) | 162 grams or pounds per hour. |
| Amine (ethylenediamine) | 90 grams or pounds per hour. |
| Volume of reaction zone | 350 milliliters or 40 gallons. |
| Volume of water present | 180 milliliters or 22½ gallons. |
| Yield, ethylenediaminetetraaceto nitrile | 322 grams or pounds per hour. |

In the tabulation, the weights in pounds are used with volumes in gallons; and weights in grams are used with volumes in milliliters.

These rates of feed result in the quantitative production of ethylenediaminetetraaceto nitrile at the rate of 322 grams or pounds per hour. The reaction can be conducted on any scale, the basic limitation being temperature control within the reaction zone itself.

Syntheses have been carried out in accordance with these procedures using all amines which are currently converted and sold in the United States as chelating agents. In each case all hydrogens directly attached to the nitrogens are replaced to form the corresponding nitrile.

These include the following:

Amine:
| | |
|---|---|
| Ammonia | Benzylamine. |
| Ethylenediamine | 1,2-cyclohexylene diamine. |
| Diethylene triamine | 1,2-cyclopentyl diamine. |
| Triethylene tetramine | Hydroxyethylethylene diamine. |
| Propylene diamine | N,N' - dihydroxyethylethylenediamine. |
| Dipropylene triamine | Aryl amines (aniline, toluidine). |
| Tripropylene tetramine | Substituted aryl amines (meta hydroxy aniline). |

Aromatic substituted aliphatic amines, such as:

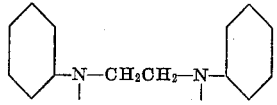

In each instance the amine reacts rapidly to form a corresponding nitrile which is precipitated from the reaction mixture. Where the amine nitrile is not completely insoluble in the reaction medium, its volume is so limited that a condition of saturation of the reaction medium is quickly developed, which causes the nitrile to precipitate. It will be noted from the structure of the variety of amines listed that the process described is useful to form the nitrile of any amine which carries 1 or more hydrogen atoms on the nitrogen atom.

Following the procedure for Example I it is possible to prepare the tri-nitrile of ammonia in substantially quantitative yields based on the ammonia used.

*Example V*

Using a reaction vessel containing three moles of formaldehyde, 37 or 50 percent commercial solution, three moles of liquid hydrogen cyanide, and 1.5 milliliters of 96 percent sulfuric acid liquid ammonia is added to the warmed solution at a rate to keep the temperature at 50° to 60° C. (although it may be allowed to go to higher temperatures; at temperatures below 50° C. the reaction proceeds slowly). Shortly after the $NH_3$ flow is started saturation occurs and a precipitate of the trinitrile forms. It is then separated.

Hydrolysis of the trinitrile to the salt of nitrilotriacetic acid is accomplished directly by dissolving it in an alkali solution in stoichiometric amount. Sodium, potassium or lithium salts may be formed by use of the corresponding alkali.

Hydrolysis to the free acid is accomplished by reacting the nitrile with a strong mineral acid such as hydrochloric, or sulfuric or a mixture of the two.

The process may be carried on as a batch or as a continuous one. If it is to be a continuous one, it will be found that the size of reaction zone is determined by the facility with which the temperature of the reaction medium can be controlled.

One of the primary advantages of the process described herein, other than its capacity to be carried out as a continuous one is the fact that isolation of the nitrile does not depend upon its physical characteristics. Nitriles made by processes described in United States Patents 2,164,781 and 2,205,995 require that the nitrile be either an insoluble solid or an oil in order to get a reasonably pure compound. Separation and purification of a nitrile which exhibits high solubility in water is very difficult and is not practical for commercial production at the present time. In this new method however, the reaction mixture will become saturated with the nitrile. This in no way affects the reaction. Since the reaction volume is kept essentially constant, and since anhydrous materials are added to make up for the materials used as the reaction progresses, any nitrile in excess of that which dissolves to saturation in the reaction mixture will precipitate and will be easily removable from the system. In this method of synthesis the only effect noticeable in the synthesis of a highly soluble nitrile is that a slightly longer time after commencement of the reaction will be required before any nitrile begins to precipitate.

In the event that the nitrile is an oil, centrifugal separators may be used to isolate the nitrile from the reaction mixture.

The temperature of the reaction and the rate of addition of the amine will vary from one amine to another. Ethylenediamine for instance reacts rapidly at a temperature of 35° C. Using a ratio of one mole of hydrocyanic acid and one mole of formaldehyde for every reactive hydrogen present on the amine, one finds that the diamine can be added at a rate of approximately one-half mole in 20 to 30 minutes. In most instances the rate of addition is dependent upon the cooling capacity of the equipment. There is a significant amount of heat generated when the reaction takes place and the rate of addition of the amine is determined primarily by the rate at which the heat of reaction can be removed from the system.

In the synthesis of the trinitrile of ammonia we find that higher temperatures are required in order to make the reaction run smoothly. Ammonia should be introduced into the reaction mixture as the anhydrous gas at a temperature of from 50° to 60° C.

It is desirable that the amine be added at such a rate that the pH of the reacting solution does not exceed pH 1. Preferably the pH of the reaction mixture should be maintained below pH 0.5. The pH will rise only on the rapid addition of the alkaline amine.

Once the nitrile has been isolated, it can be hydrolyzed to the corresponding sodium salt of the substituted acetic acid by boiling it in equivalent amounts of sodium hydroxide solution. Hydrolysis in most cases is rapid and ammonia is evolved in quantity during the saponification. Yield of amino acid from the nitrile by saponification with caustic is also essentially quantitative.

What is claimed is:

1. The method of preparing amine nitriles which comprises establishing and maintaining a liquid phase reaction medium containing formaldehyde and liquid hydrogen cyanide, maintaining the pH of said medium at a strong acid level, and introducing amine having a replaceable hydrogen thereto at a rate such that all the amine introduced is substantially immediately reacted, thereby to form the corresponding aceto nitrile and separating the aceto nitrile which is formed.

2. The method in accordance with claim 1 in which the temperature of the reaction medium is kept below about 100° C. and the pH of the reaction medium is maintained at a level below about 3.

3. The method in accordance with claim 1 in which the temperature of the reaction medium is kept in the range from about 35° to about 50° C.

4. The method of forming amine nitriles which comprises establishing and maintaining a liquid phase reaction medium of predetermined volume, maintaining in said medium a given proportion of formaldehyde and a corresponding known amount of liquid hydrogen cyanide, adjusting the pH of said medium to a level below about 1, and adding amine having a replaceable hydrogen thereto at a rate such that a large excess of formaldehyde and hydrogen cyanide in relation to the amount of amine introduced is always maintained in said medium, adding formaldehyde and hydrogen cyanide in substantially the ratio consumed in the reaction, thereby to form a corresponding aceto nitrile and separating the aceto nitrile which is formed.

5. The method in accordance with claim 4 in which the temperature of the reaction medium is kept below about 100° C.

6. The method in accordance with claim 4 in which the reaction medium is cooled and the rate of addition of amine is kept such that the temperature of the medium is held within the range from about 35° C. to about 50° C.

7. The method in accordance with claim 6 in which the reaction is conducted continuously by first establishing said reaction zone and thereafter introducing the amine, formaldehyde and liquid hydrogen cyanide in substantially stoichiometric amounts thereby to maintain in said reaction zone a substantially constant volume.

8. The method of forming ethylenediaminetetraaceto nitrile which comprises establishing a reaction zone containing a given volume of aqueous formaldehyde solution and liquid hydrogen cyanide, thereby to establish a cyanide addition reaction medium of a given predetermined volume, acidifying said reaction medium to a level of pH below about 1, introducing ethylenediamine to said reaction medium at a rate such that it is substantially immediately reacted so that no free ethylenediamine is present in the system for any appreciable time interval, while maintaining the temperature of said reaction zone at a level below about 100° C., and maintaining substantially constant volume of reactant aldehyde and cyanide during the addition of ethylenediamine and removing precipitated ethylenediaminetetraaceto nitrile.

9. The method in accordance with claim 8 in which the temperature of the reaction medium is maintained at a level from about 35 to 50° C.

10. The method of making nitrilo triaceto nitrile which comprises, establishing a reaction medium of predetermined volume, maintaining in said reaction medium a known quantity of formaldehyde and liquid hydrogen cyanide, acidifying said medium to a pH below about 1, and adding anhydrous ammonia to said medium at a rate such that substantially no free ammonia is present in the medium for any appreciable interval of time following addition, and maintaining the temperature of the reaction medium below about 100° C.

11. The method in accordance with claim 10 in which the temperature is maintained in the range from about 35 to 50° C.

12. The method of making diethylenetriamine pentaaceto nitrile which comprises establishing a reaction medium of a predetermined restricted volume, maintaining in said reaction medium a quantity of formaldehyde and liquid hydrogen cyanide, strongly acidifying said medium introducing diethylenetriamine into said medium at a rate such that substantially immediate reaction follows and so that no free diethylenetriamine is present in the medium for any appreciable time interval after addition and maintaining the temperature of said medium below about 100° C.

13. In a process for the reaction of amines with hydrogen cyanide and formaldehyde the improvement comprising establishing a reaction zone of restricted volume containing aldehyde and hydrogen cyanide reactants in an aqueous medium maintained in liquid phase at a level of pH below about 1, and adding the amine having a replaceable hydrogen at a rate such that substantially instantaneous reaction thereof with the reactants is obtained, and periodically adding aldehyde and hydrogen cyanide reactants to the reaction zone to maintain free aldehyde and cyanide in said reaction medium, and separating nitrile formed.

14. The method in accordance with claim 13 in which the temperature is kept below about 100° C.

References Cited in the file of this patent

UNITED STATES PATENTS

| | | |
|---|---|---|
| 2,205,995 | Ulrich et al. | June 25, 1940 |
| 2,405,966 | Leder | Aug. 20, 1946 |
| 2,589,208 | Craig et al. | Mar. 18, 1952 |